(12) United States Patent
Hare et al.

(10) Patent No.: US 10,474,900 B2
(45) Date of Patent: Nov. 12, 2019

(54) REAL-TIME TRACKING-COMPENSATED IMAGE EFFECTS

(71) Applicant: Snap Inc., Santa Monica, CA (US)

(72) Inventors: Samuel Edward Hare, Pacific Palisades, CA (US); Fedir Poliakov, Marina Del Ray, CA (US); Guohui Wang, Los Angeles, CA (US); Xuehan Xiong, Los Angeles, CA (US); Jianchao Yang, Venice, CA (US); Linjie Yang, Los Angeles, CA (US); Shah Tanmay Anilkumar, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 40 days.

(21) Appl. No.: 15/706,096

(22) Filed: Sep. 15, 2017

(65) Prior Publication Data

US 2019/0087660 A1    Mar. 21, 2019

(51) Int. Cl.
*G06K 9/00* (2006.01)
*G06T 7/246* (2017.01)
*G06T 1/20* (2006.01)

(52) U.S. Cl.
CPC ............ *G06K 9/00711* (2013.01); *G06T 1/20* (2013.01); *G06T 7/248* (2017.01); *G06T 2200/28* (2013.01); *G06T 2207/10016* (2013.01); *G06T 2207/20081* (2013.01)

(58) Field of Classification Search
CPC ..... G06T 1/20; G06T 5/00; G06T 7/11; G06T 7/20; G06T 7/215; G06T 7/246; G06T 2200/28; G06K 9/00711; H04N 5/262; H04N 9/74
See application file for complete search history.

(56) References Cited

U.S. PATENT DOCUMENTS

| | | | |
|---|---|---|---|
| 4,189,743 A * | 2/1980 | Schure et al. | G06T 11/40 345/173 |
| 5,754,939 A | 5/1998 | Herz et al. | 455/4.2 |
| 6,038,295 A | 3/2000 | Mattes | 379/93.25 |

(Continued)

FOREIGN PATENT DOCUMENTS

| | | | |
|---|---|---|---|
| CA | 2887596 A1 | 7/2015 | H04L 12/16 |
| EP | 3166069 A1 | 5/2017 | G06T 3/40 |

(Continued)

OTHER PUBLICATIONS

"International Application Serial No. PCT/US2018/051141, International Search Report dated Jan. 4, 2019", 4 pgs.

(Continued)

*Primary Examiner* — Andrew W Johns
(74) *Attorney, Agent, or Firm* — Schwegman Lundberg & Woessner, P.A.

(57) ABSTRACT

A mobile device can generate real-time complex visual image effects using asynchronous processing pipeline. A first pipeline applies a complex image process, such as a neural network, to keyframes of a live image sequence. A second pipeline generates flow maps that describe feature transformations in the image sequence. The flow maps can be used to process non-keyframes on the fly. The processed keyframes and non-keyframes can be used to display a complex visual effect on the mobile device in real-time or near real-time.

20 Claims, 14 Drawing Sheets

(56) References Cited

U.S. PATENT DOCUMENTS

| | | | |
|---|---|---|---|
| 6,158,044 A | 12/2000 | Tibbetts | 717/1 |
| 6,167,435 A | 12/2000 | Druckenmiller et al. | 709/206 |
| 6,205,432 B1 | 3/2001 | Gabbard et al. | 705/14 |
| 6,310,694 B1 | 10/2001 | Okimoto et al. | 358/1.15 |
| 6,484,196 B1 | 11/2002 | Maurille | 709/206 |
| 6,487,586 B2 | 11/2002 | Ogilvie et al. | 709/206 |
| 6,665,531 B1 | 12/2003 | Soderbacka et al. | 455/412 |
| 6,701,347 B1 | 3/2004 | Ogilvie | 709/206 |
| 6,711,608 B1 | 3/2004 | Ogilvie | 709/206 |
| 6,757,713 B1 | 6/2004 | Ogilvie et al. | 709/206 |
| 6,980,909 B2 | 12/2005 | Root et al. | 702/3 |
| 7,124,164 B1 | 10/2006 | Chemtob | 709/204 |
| 7,149,893 B1 | 12/2006 | Leonard et al. | 713/154 |
| 7,173,651 B1 | 2/2007 | Knowles | 348/207.1 |
| 7,243,163 B1 | 7/2007 | Friend et al. | 709/248 |
| 7,278,168 B1 | 10/2007 | Chaudhury et al. | 726/30 |
| 7,356,564 B2 | 4/2008 | Hartselle et al. | 709/206 |
| 7,376,715 B2 | 5/2008 | Cunningham et al. | 709/219 |
| 7,411,493 B2 | 8/2008 | Smith | 340/539.18 |
| 7,478,402 B2 | 1/2009 | Christensen et al. | 719/313 |
| 7,496,347 B2 | 2/2009 | Puranik | 455/410 |
| 7,519,670 B2 | 4/2009 | Hagale et al. | 709/206 |
| 7,535,890 B2 | 5/2009 | Rojas | 370/352 |
| 7,607,096 B2 | 10/2009 | Oreizy et al. | 715/751 |
| 7,703,140 B2 | 4/2010 | Nath et al. | 726/26 |
| 7,912,896 B2 | 3/2011 | Wolovitz et al. | 709/203 |
| 8,131,597 B2 | 3/2012 | Hudetz et al. | 705/26.1 |
| 8,170,957 B2 | 5/2012 | Richard | 705/76 |
| 8,199,747 B2 | 6/2012 | Rojas et al. | 370/354 |
| 8,214,443 B2 | 7/2012 | Hamburg | 709/206 |
| 8,238,947 B2 | 8/2012 | Lottin et al. | 455/466 |
| 8,244,593 B2 | 8/2012 | Klinger et al. | 705/26.1 |
| 8,312,097 B1 | 11/2012 | Siegel et al. | 709/207 |
| 8,332,475 B2 | 12/2012 | Rosen et al. | 709/206 |
| 8,570,907 B2 | 10/2013 | Garcia, Jr. et al. | 370/259 |
| 8,718,333 B2 | 5/2014 | Wolf et al. | 382/115 |
| 8,724,622 B2 | 5/2014 | Rojas | 370/352 |
| 8,745,132 B2 | 6/2014 | Obradovich | 709/204 |
| 8,874,677 B2 | 10/2014 | Rosen et al. | H04L 51/36 |
| 8,909,679 B2 | 12/2014 | Root et al. | H04W 4/02 |
| 8,909,714 B2 | 12/2014 | Agarwal et al. | G06Q 10/107 |
| 8,909,725 B1 | 12/2014 | Sehn | H04L 67/26 |
| 8,914,752 B1 | 12/2014 | Spiegel | G06F 3/044 |
| 8,995,433 B2 | 3/2015 | Rojas | H04L 51/04 |
| 9,040,574 B2 | 5/2015 | Wang et al. | A61K 31/404 |
| 9,055,416 B2 | 6/2015 | Rosen et al. | H04W 4/12 |
| 9,083,770 B1 | 7/2015 | Drose et al. | H04L 65/403 |
| 9,094,137 B1 | 7/2015 | Sehn | H04H 20/61 |
| 9,100,806 B2 | 8/2015 | Rosen et al. | H04W 4/12 |
| 9,100,807 B2 | 8/2015 | Rosen et al. | H04W 4/12 |
| 9,113,301 B1 | 8/2015 | Spiegel et al. | H04W 4/021 |
| 9,148,424 B1 | 9/2015 | Yang | H04L 63/083 |
| 9,191,776 B2 | 11/2015 | Root et al. | H04W 4/02 |
| 9,204,252 B2 | 12/2015 | Root et al. | H04W 4/02 |
| 9,225,805 B2 | 12/2015 | Kujawa et al. | H04L 69/16 |
| 9,225,897 B1 | 12/2015 | Sehn et al. | H04N 5/23222 |
| 9,237,202 B1 | 1/2016 | Sehn | H04L 67/26 |
| 9,264,463 B2 | 2/2016 | Rubinstein et al. | H04L 65/403 |
| 9,276,886 B2 | 3/2016 | Samaranayake | H04L 51/16 |
| 9,294,425 B1 | 3/2016 | Son | H04L 51/18 |
| 9,385,983 B1 | 7/2016 | Sehn | H04L 51/14 |
| 9,396,354 B1 | 7/2016 | Murphy et al. | G06F 21/6245 |
| 9,407,712 B1 | 8/2016 | Sehn | H04L 67/26 |
| 9,407,816 B1 | 8/2016 | Sehn | H04N 5/23222 |
| 9,430,783 B1 | 8/2016 | Sehn | G06Q 30/0276 |
| 9,443,227 B2 | 9/2016 | Evans et al. | G06Q 10/107 |
| 9,482,882 B1 | 11/2016 | Hanover et al. | G02C 11/10 |
| 9,482,883 B1 | 11/2016 | Meisenholder | G02C 11/10 |
| 9,489,661 B2 | 11/2016 | Evans et al. | G06Q 10/107 |
| 9,491,134 B2 | 11/2016 | Rosen et al. | H04L 51/36 |
| 9,532,171 B2 | 12/2016 | Allen et al. | H04W 4/021 |
| 9,537,811 B2 | 1/2017 | Allen et al. | H04L 51/22 |
| 9,560,006 B2 | 1/2017 | Prado et al. | H04L 51/34 |
| 9,628,950 B1 | 4/2017 | Noeth et al. | H04W 4/021 |
| 9,652,896 B1 | 5/2017 | Jurgenson et al. | G06T 19/006 |
| 9,659,244 B2 | 5/2017 | Anderton et al. | G06K 19/06131 |
| 9,693,191 B2 | 6/2017 | Sehn | H04W 4/021 |
| 9,705,831 B2 | 7/2017 | Spiegel | H04L 51/16 |
| 9,742,713 B2 | 8/2017 | Spiegel et al. | H04L 51/16 |
| 9,785,796 B1 | 10/2017 | Murphy et al. | G06F 21/6245 |
| 9,825,898 B2 | 11/2017 | Sehn | H04L 51/26 |
| 9,854,219 B2 | 12/2017 | Sehn | H04N 9/806 |
| 9,961,520 B2 | 5/2018 | Brooks et al. | H04W 4/14 |
| 2002/0041339 A1* | 4/2002 | Diepold | G06T 7/20 348/700 |
| 2002/0047868 A1 | 4/2002 | Miyazawa | 345/835 |
| 2002/0144154 A1 | 10/2002 | Tomkow | 713/201 |
| 2003/0052925 A1 | 3/2003 | Daimon et al. | 345/810 |
| 2003/0126215 A1 | 7/2003 | Udell et al. | 709/206 |
| 2003/0217106 A1 | 11/2003 | Adar et al. | 709/206 |
| 2004/0203959 A1 | 10/2004 | Coombes | 455/466 |
| 2005/0097176 A1 | 5/2005 | Schatz et al. | 709/206 |
| 2005/0198128 A1 | 9/2005 | Anderson et al. | 709/204 |
| 2005/0223066 A1 | 10/2005 | Buchheit et al. | 709/206 |
| 2006/0242239 A1 | 10/2006 | Morishima et al. | 709/204 |
| 2006/0270419 A1 | 11/2006 | Crowley et al. | 455/456.2 |
| 2007/0038715 A1 | 2/2007 | Collins et al. | 709/206 |
| 2007/0064899 A1 | 3/2007 | Boss et al. | 379/201.01 |
| 2007/0073823 A1 | 3/2007 | Cohen et al. | 709/207 |
| 2007/0214106 A1 | 9/2007 | Johnston et al. | 709/204 |
| 2007/0233801 A1 | 10/2007 | Eren et al. | 709/207 |
| 2008/0055269 A1 | 3/2008 | Lemay et al. | 345/173 |
| 2008/0120409 A1 | 5/2008 | Sun et al. | 709/224 |
| 2008/0207176 A1 | 8/2008 | Brackbill et al. | 455/413 |
| 2008/0270938 A1 | 10/2008 | Carlson | 715/810 |
| 2008/0306826 A1 | 12/2008 | Kramer et al. | 705/14 |
| 2008/0313346 A1 | 12/2008 | Kujawa et al. | 709/236 |
| 2009/0042588 A1 | 2/2009 | Lottin et al. | 455/466 |
| 2009/0132453 A1 | 5/2009 | Hangartner et al. | 706/46 |
| 2009/0265737 A1* | 10/2009 | Issa et al. | G06Q 10/10 725/38 |
| 2010/0082427 A1 | 4/2010 | Burgener et al. | 705/14.49 |
| 2010/0131880 A1 | 5/2010 | Lee et al. | 715/769 |
| 2010/0185665 A1 | 7/2010 | Horn et al. | 707/769 |
| 2010/0306669 A1 | 12/2010 | Della Pasqua | 715/752 |
| 2011/0099507 A1 | 4/2011 | Nesladek et al. | 715/780 |
| 2011/0145564 A1 | 6/2011 | Moshir et al. | 713/154 |
| 2011/0202598 A1 | 8/2011 | Evans et al. | 709/203 |
| 2011/0213845 A1 | 9/2011 | Logan et al. | 709/206 |
| 2011/0286586 A1 | 11/2011 | Saylor et al. | 379/88.13 |
| 2011/0320373 A1 | 12/2011 | Lee et al. | 705/319 |
| 2012/0028659 A1 | 2/2012 | Whitney et al. | 455/466 |
| 2012/0184248 A1 | 7/2012 | Speede | 455/411 |
| 2012/0209921 A1 | 8/2012 | Adafin et al. | 709/206 |
| 2012/0209924 A1 | 8/2012 | Evans et al. | 709/206 |
| 2012/0254325 A1 | 10/2012 | Majeti et al. | 709/206 |
| 2012/0278692 A1 | 11/2012 | Shi | 715/205 |
| 2012/0304080 A1 | 11/2012 | Wormald et al. | 715/758 |
| 2013/0071040 A1 | 3/2013 | Jin et al. | 382/254 |
| 2013/0071093 A1 | 3/2013 | Hanks et al. | 386/295 |
| 2013/0187952 A1 | 7/2013 | Berkovich et al. | G06T 19/006 |
| 2013/0194301 A1 | 8/2013 | Robbins et al. | G06F 21/60 |
| 2013/0290443 A1 | 10/2013 | Collins et al. | H04L 51/18 |
| 2014/0032682 A1 | 1/2014 | Prado et al. | 709/206 |
| 2014/0122787 A1 | 5/2014 | Shalvi et al. | G06F 3/0688 |
| 2014/0201527 A1 | 7/2014 | Krivorot | G06F 21/602 |
| 2014/0282096 A1 | 9/2014 | Rubinstein et al. | H04L 65/403 |
| 2014/0325383 A1 | 10/2014 | Brown et al. | G06F 3/04842 |
| 2014/0359024 A1 | 12/2014 | Spiegel | H04L 51/16 |
| 2014/0359032 A1 | 12/2014 | Spiegel et al. | H04L 51/16 |
| 2015/0199082 A1 | 7/2015 | Scholler et al. | G06F 3/0482 |
| 2015/0227602 A1 | 8/2015 | Ramu et al. | G06F 17/30575 |
| 2016/0085773 A1 | 3/2016 | Chang et al. | G06F 17/30241 |
| 2016/0085863 A1 | 3/2016 | Allen et al. | G06F 17/30867 |
| 2016/0086670 A1 | 3/2016 | Gross et al. | G11C 16/14 |
| 2016/0099901 A1 | 4/2016 | Allen et al. | H04L 51/22 |
| 2016/0180887 A1 | 6/2016 | Sehn | G11B 27/036 |
| 2016/0277419 A1 | 9/2016 | Allen et al. | H04L 63/107 |
| 2016/0321708 A1 | 11/2016 | Sehn | G06Q 30/0275 |
| 2016/0359957 A1 | 12/2016 | Laliberte | H04L 67/10 |
| 2016/0359987 A1 | 12/2016 | Laliberte | H04L 67/18 |
| 2017/0018056 A1 | 1/2017 | Holzer et al. | G06T 3/20 |
| 2017/0148223 A1 | 5/2017 | Holzer et al. | G06T 19/006 |

(56) References Cited

U.S. PATENT DOCUMENTS

| | | | |
|---|---|---|---|
| 2017/0161382 A1 | 6/2017 | Ouimet et al. | G06F 17/30817 |
| 2017/0263029 A1 | 9/2017 | Yan et al. | G06T 11/60 |
| 2017/0287006 A1 | 10/2017 | Azmoodeh et al. | G06Q 30/0261 |
| 2017/0295250 A1 | 10/2017 | Samaranayake et al. | H04L 67/22 |
| 2017/0374003 A1 | 12/2017 | Allen et al. | H04L 51/22 |
| 2017/0374508 A1 | 12/2017 | Davis et al. | H04W 4/021 |

FOREIGN PATENT DOCUMENTS

| | | | | |
|---|---|---|---|---|
| WO | WO-2012000107 A1 | 1/2012 | | H04W 4/04 |
| WO | WO-2013008251 A2 | 1/2013 | | G06F 17/20 |
| WO | WO-2014194262 A2 | 12/2014 | | H04L 29/06 |
| WO | WO-2015192026 A1 | 12/2015 | | G06Q 10/00 |
| WO | WO-2016054562 A1 | 4/2016 | | G06Q 50/00 |
| WO | WO-2016065131 A1 | 4/2016 | | G06Q 30/02 |
| WO | WO-2016/112299 A1 | 7/2016 | | G06T 5/00 |
| WO | WO-2016179166 A1 | 11/2016 | | G06F 17/21 |
| WO | WO-2016179235 A1 | 11/2016 | | G06F 3/041 |
| WO | WO-2017176739 A1 | 10/2017 | | H04W 4/02 |
| WO | WO-2017176992 A1 | 10/2017 | | G06F 3/048 |
| WO | WO-2018005644 A1 | 1/2018 | | G06Q 30/02 |
| WO | WO-2019055822 A1 | 3/2019 | | G06T 7/20 |

OTHER PUBLICATIONS

"International Application Serial No. PCT/US2018/051141, Written Opinion dated Jan. 4, 2019", 5 pgs.

Castelluccia, Claude, et al., "EphPub: Toward robust Ephemeral Publishing", 19TH IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", [Online] Retrieved from the internet: <URL: http://www.theregister.co.uk/2005/12/12/stealthtext/>, (Dec. 12, 2005), 1 pg.

Melanson, Mike, "This text message will self destruct in 60 seconds", URL: http://readwrite.com/2011/02/11/this_text_message_will_self_destruct_in_60_seconds, (Feb. 18, 2015), 4 pgs.

Sawers, Paul, "Snapchat for iOS Lets You Send Photos to Friends and Set How long They're Visible for", URL: https://thenextweb.com/apps/2012/05/07/snapchat-for-ios-lets-you-send-photos-to-friends-and-set-how-long-theyre-visible-for/, (May 7, 2012), 5 pgs.

Sheik, Esther, "Ephemeral Data", Communications of the ACM, vol. 56, No. 9, (Sep. 2013), 3 pgs.

Vaas, Lisa, "StealthText, Should You Choose to Accept It", URL: http://www.eweek.com/print/c/a/MessagingandCollaboration/StealthTextShouldYouChoosetoAcceptIt, (Dec. 13, 2005), 2 pgs.

* cited by examiner

REAL-TIME TRACKING-COMPENSATED IMAGE EFFECTS

TECHNICAL FIELD

The present disclosure generally relates to machines configured to the technical field of special-purpose machines that manage electronic image processing and improvements to such variants, and to the technologies by which such special-purpose machines become improved compared to other special-purpose machines for managing asynchronous real-time image sequence processing.

BACKGROUND

Computers can perform image processing using complex computer vision (CV) schemes, such as convolutional neural networks. The CV schemes can be computationally intensive and usually require powerful processors and large amounts of memory. It is often impractical to execute CV schemes on mobile devices because the mobile devices have limited computational resources, which causes long processing times. More so, applying an intensive CV scheme in real time (e.g., 30 frames per second) using a mobile device is currently very difficult, if not impossible.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 9:
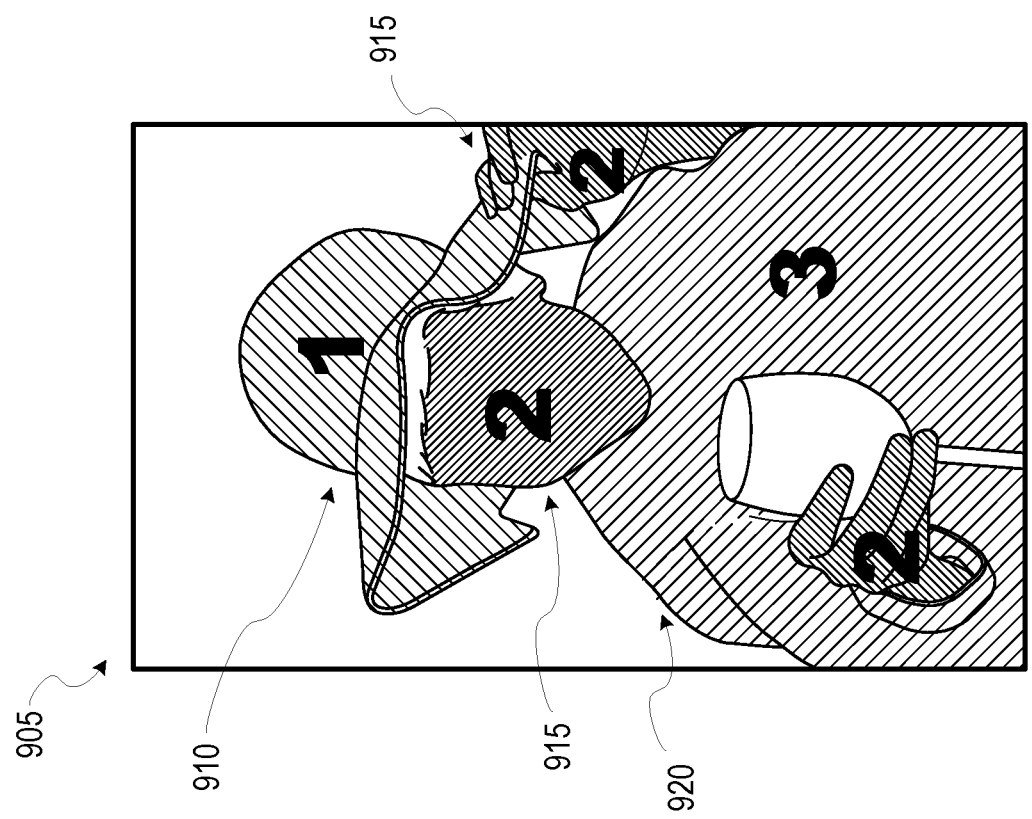
FIG. 9 shows an example of an image and a corresponding image mask, according to some example embodiments.
Figure 9:

Computers can perform image processing using complex computer vision (CV) schemes, such as generating image masks using a convolutional neural network (CNN). An image mask is a collection of numerical values that label areas of a given image. In some example embodiments, image masks for live video can be generated by generating keyframe image masks using a CNN, then using optical flow tracking algorithms to create image masks for non-keyframes. FIG. 9 shows an example an image 900 and a corresponding image mask 905. The image 900 is of a girl holding a wine glass. A CNN can be trained to detect different areas of a given image, such as a skin area, a clothes area, a hat area, and so on. The trained CNN can then receive an image as an input and determine which areas of the image correspond to a hat segment, a skin segments, or a clothes segment, for example, and create a new image mask having pixel values for the detected segments.

In the example of FIG. 9, a CNN has received image 900 as an input and has generated image mask 905 with labeled segments, including a hat segment 910, one or more skin segments 915 (the girl's face and hands), and a clothes segment 920. Each segment may have a numerical value that has been pre-assigned as a label for a given segment. For example, the pixels of the hat segment 910 may have a value of 1, the one or more skin segments 915 may have a value of 2, and the clothes segment 920 may have a value of 3. As discussed in further detail below, the mask values are stored in a separate image having the same size dimensions as the original image, according to some example embodiments.

In some example embodiments, the image mask 905 can be used to apply effects to areas of the image 900 by specifying a segment value. For example, the color of the girl's hat can be changed from red (its original color) to a blue by replacing the pixel values that correspond to hat segment 910 in image 900. Further, if the image 900 is part of a video sequence, an image mask can be computed for every image in the video sequence, and the girl's hat can be recolored as blue in every image, thereby making the hat appear blue in the entire video sequence.

While complex CV schemes, such as CNN-based image segmentation, can achieve impressive visual effects, the schemes are usually computationally intensive and require powerful processors and large amounts of memory. Thus, it is often not practical to run the schemes from lower-powered computers, such as smartphones. While some client devices may be able to execute complex CV schemes, the processing time may be longer than a user expects (e.g., four seconds per image). Given the longer mobile device processing times, real-time display of CNN-modified images is out of reach of most client devices because real-time processing can require 30 or more frames per second.

Figure 10:
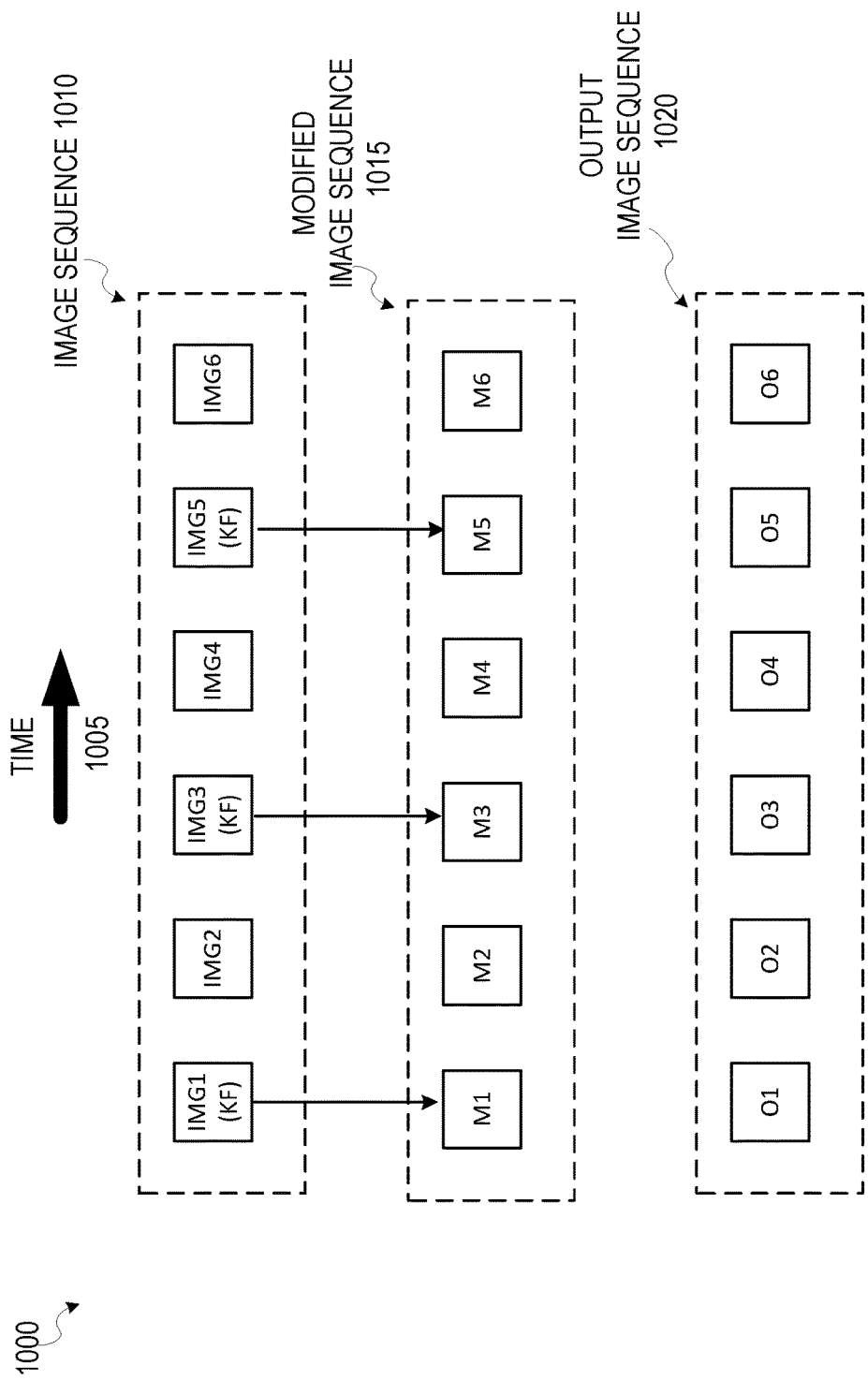
FIG. 10 shows an example data flow for implementing a tracking-based imaging system, according to some example embodiments.

To this end, a tracking-based imaging system can generate real-time complex image effects by processing keyframes of an image sequence using a complex image processing scheme (e.g., a CNN) and asynchronously processing non-keyframes using a tracking scheme (e.g., optical flow maps). FIG. 10 shows an example data flow 1000 for implementing a tracking-based imaging system, according to some example embodiments. Image sequence 1010 is a sequence of images (e.g., video) comprising IMG1-IMG6, which are captured left to right in the direction of time 1005. Modified image sequence 1015 is a sequence of modified images, such as image masks. The modified image sequence 1015 can be used to generate an output image sequence 1020 comprising output images O1-O6, which are displayed on a display screen of a client device.

As an illustrative example, assume IMG1 in image sequence 1010 is of the girl depicted in image 900 of FIG. 9, and the rest of the images in image sequence 1010 are of the girl moving about wearing her red hat. Further, M1 (of modified imaged sequence 1015) is then image mask 905 of FIG. 9. Further, M2-M6 are masks that track segments of the girl (e.g., hair, clothes) as she moves about. The masks M1-M6 can be used to apply image effects to generate output image sequence 1020, which may depict the girl moving about wearing a blue hat.

According to some example embodiments, some of the modified images, M1-M6, in the modified image sequence can be processed with a slower algorithm, such as a CNN, and some of the masks can be generated with a faster algorithm, such as optical flow. In particular, the slow or more time-consuming image process is applied to keyframes of the image sequence 1010, where keyframes are alternating images of the image sequence 1010.

For example, assume CNN-based image segmentation is applied to every other image; thus, IMG1 is a keyframe (KF) and is used to generate M1 using a CNN, IMG3 is a keyframe and is used to generate M3, and so on. To process the non-keyframes (e.g., IMG2, IMG4, etc.) an optical flow map is generated and applied to a modified image, as discussed in further detail below. By not processing some of the image masks using the slow CNN, the overall processing is greatly sped up; the output image sequence 1020 can be displayed in real-time or near real time, which the user can record and publish as an ephemeral message, as discussed in further detail below.

Figure 11:
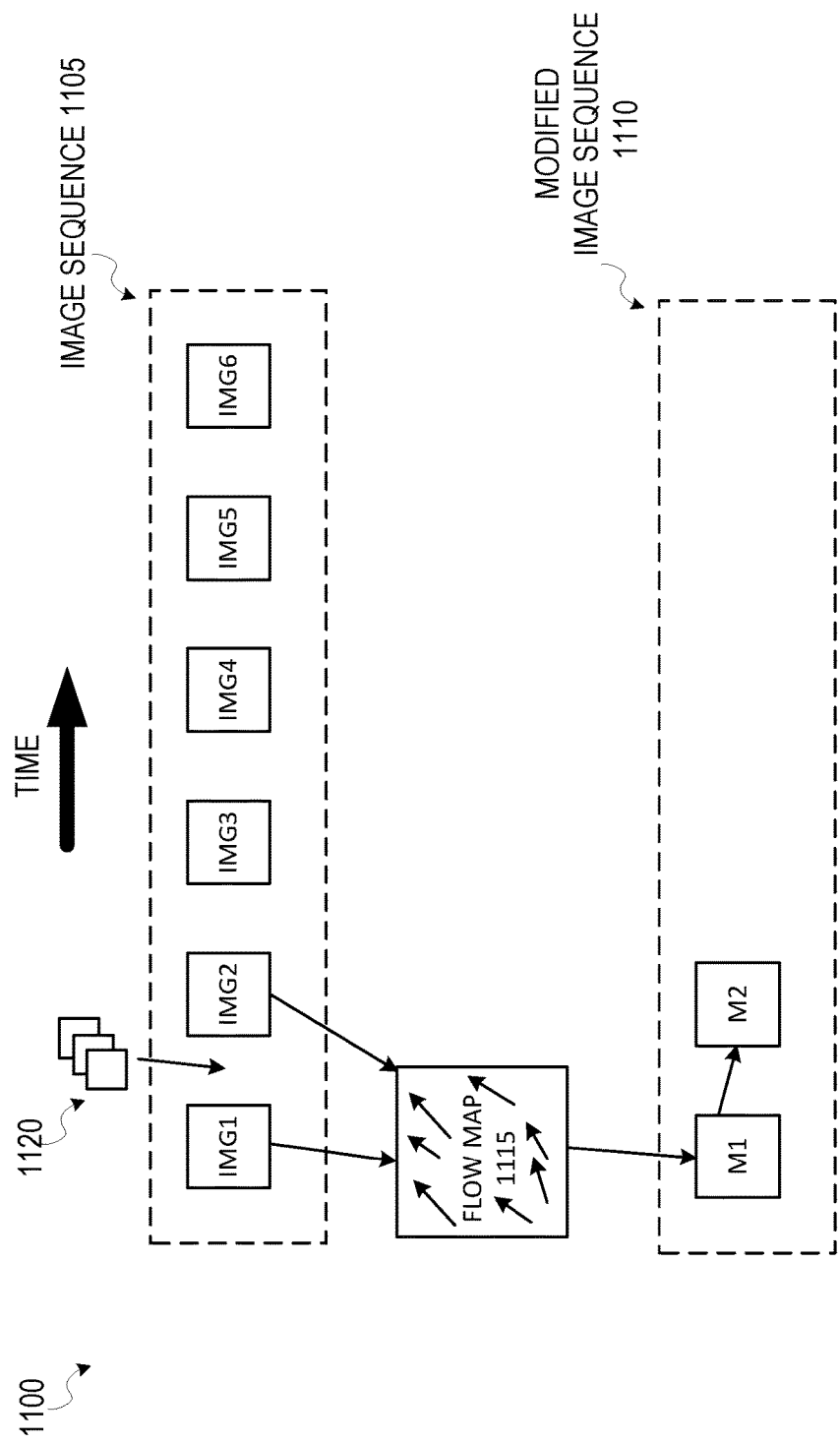
FIG. 11 shows an example data flow for generating modified images using a tracking scheme, according to some example embodiments.

FIG. 11 shows an example data flow 1100 for generating modified images using a tracking scheme, according to some example embodiments. Similar to FIG. 10, FIG. 11 shows an image sequence 1105 captured by a client device, and a modified image sequence 1110, which can be masks or final images output for display. In some example embodiments, a CNN receives IMG1 as input and generates M1 as output. To generate M2, an optical flow map algorithm is used. In particular, an optical flow map 1115 is generated that describes transformations from IMG1 to IMG2, which are original images in image sequence 1105. The flow map 1115 is then applied to M1 to create M2, thereby avoiding application of the CNN to IMG2 to create M2. In some example embodiments, the two images used to generate the flow map are separated by additional sequential images 1120, as discussed in further detail below with reference to FIGS. 8, 11, and 12.

Figure 1:
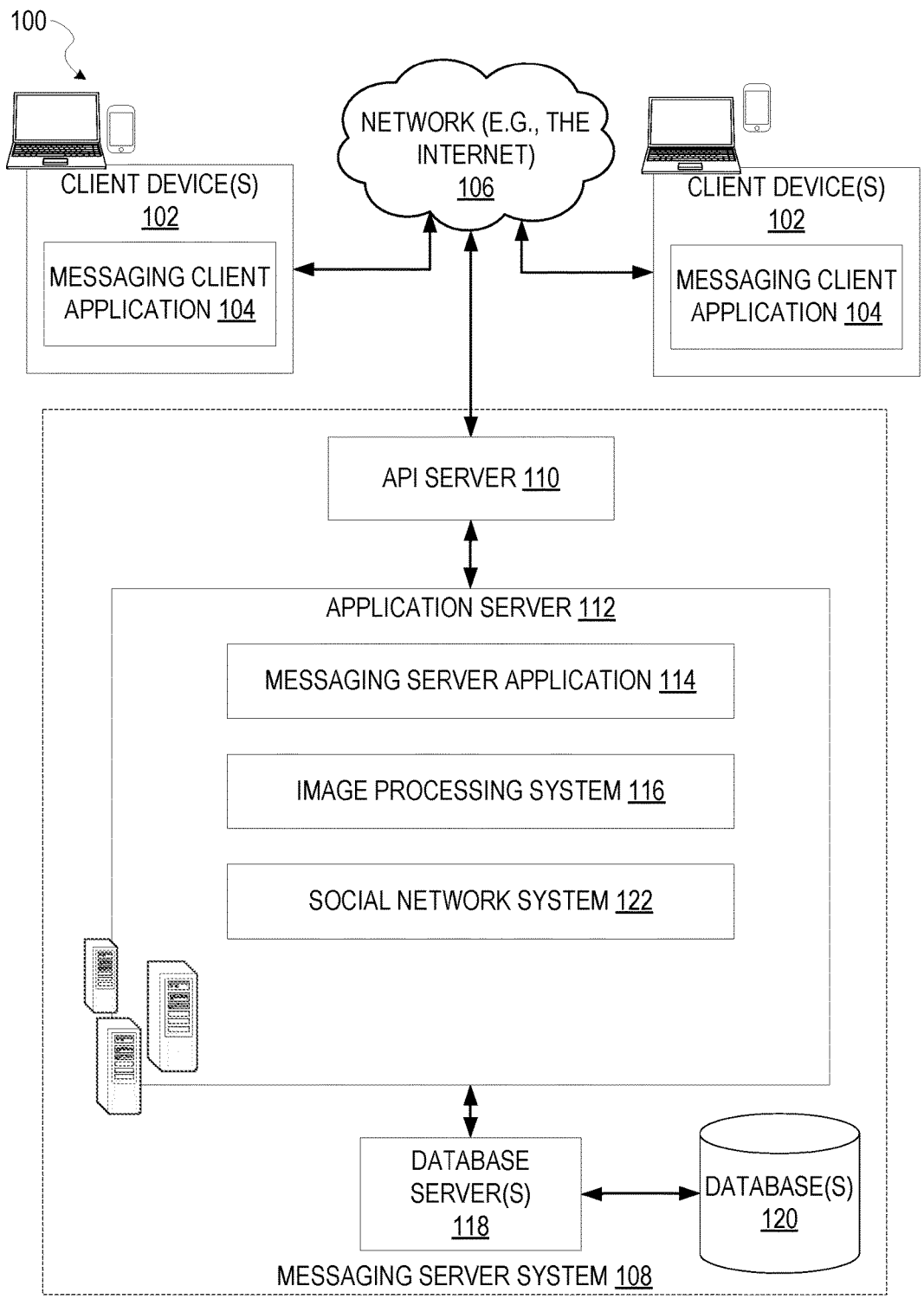
FIG. 1 is a block diagram showing an example messaging system for exchanging data (e.g., messages and associated content) over a network.

FIG. 1 shows a block diagram of an example messaging system 100 for exchanging data (e.g., social media posts created using the modified image sequence 1110) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, and a social network system 122. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user.

The application server 112 is communicatively coupled to a database server 118, which facilitates access to a database 120 in which is stored data associated with messages processed by the messaging server application 114.

Figure 2:
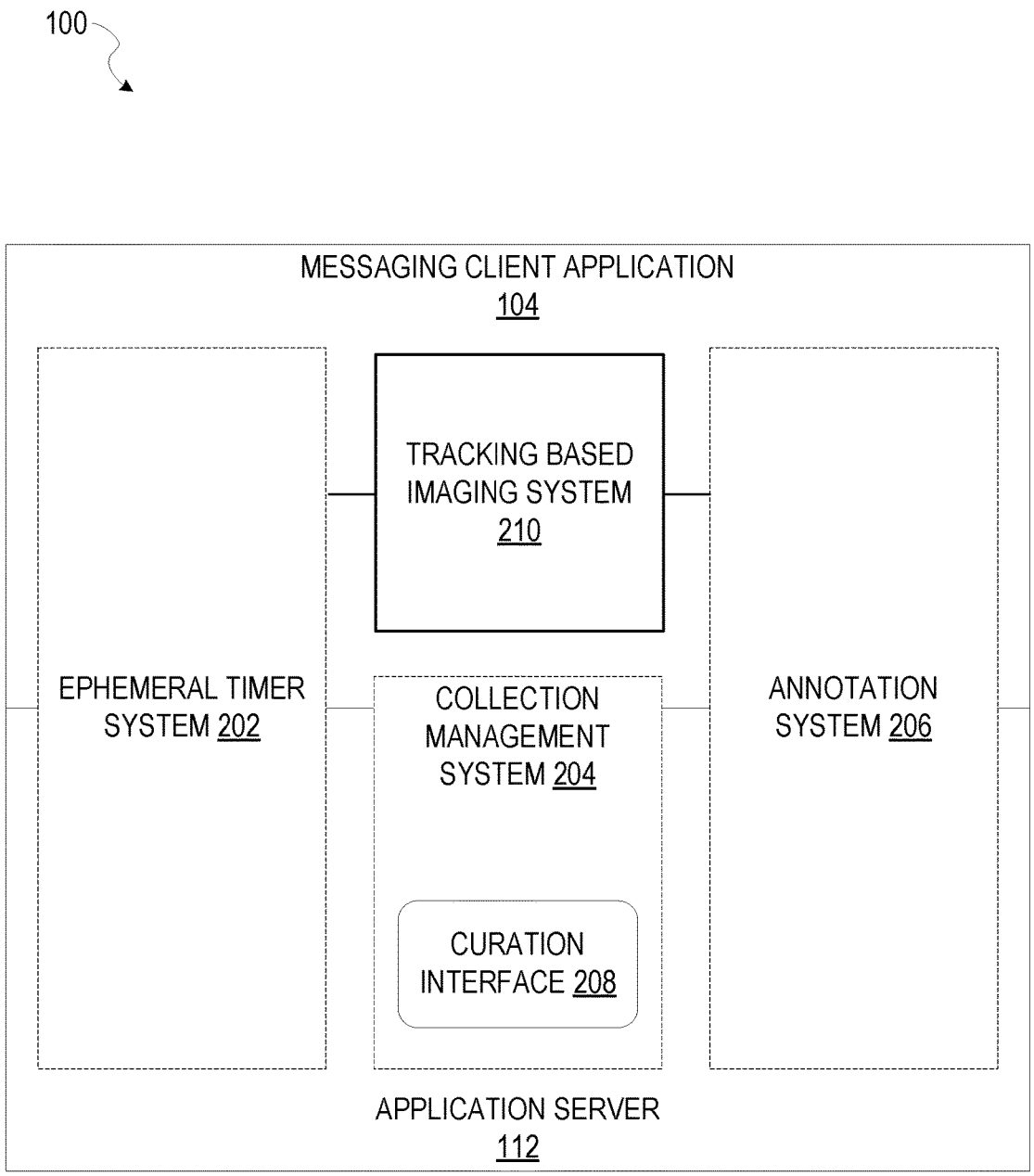
FIG. 2 is block diagram illustrating further details regarding a messaging system having an integrated virtual object machine learning system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and a tracking-based imaging system 210.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a SNAPCHAT Story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT Geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The tracking-based imaging system 210 is configured to apply complex image processing in real-time so the user can view the effect and create an image sequence. The image sequence may be annotation using the annotation system 206 and published as an ephemeral message 502, which is discussed in further detail below with reference to FIG. 5.

Figure 3:
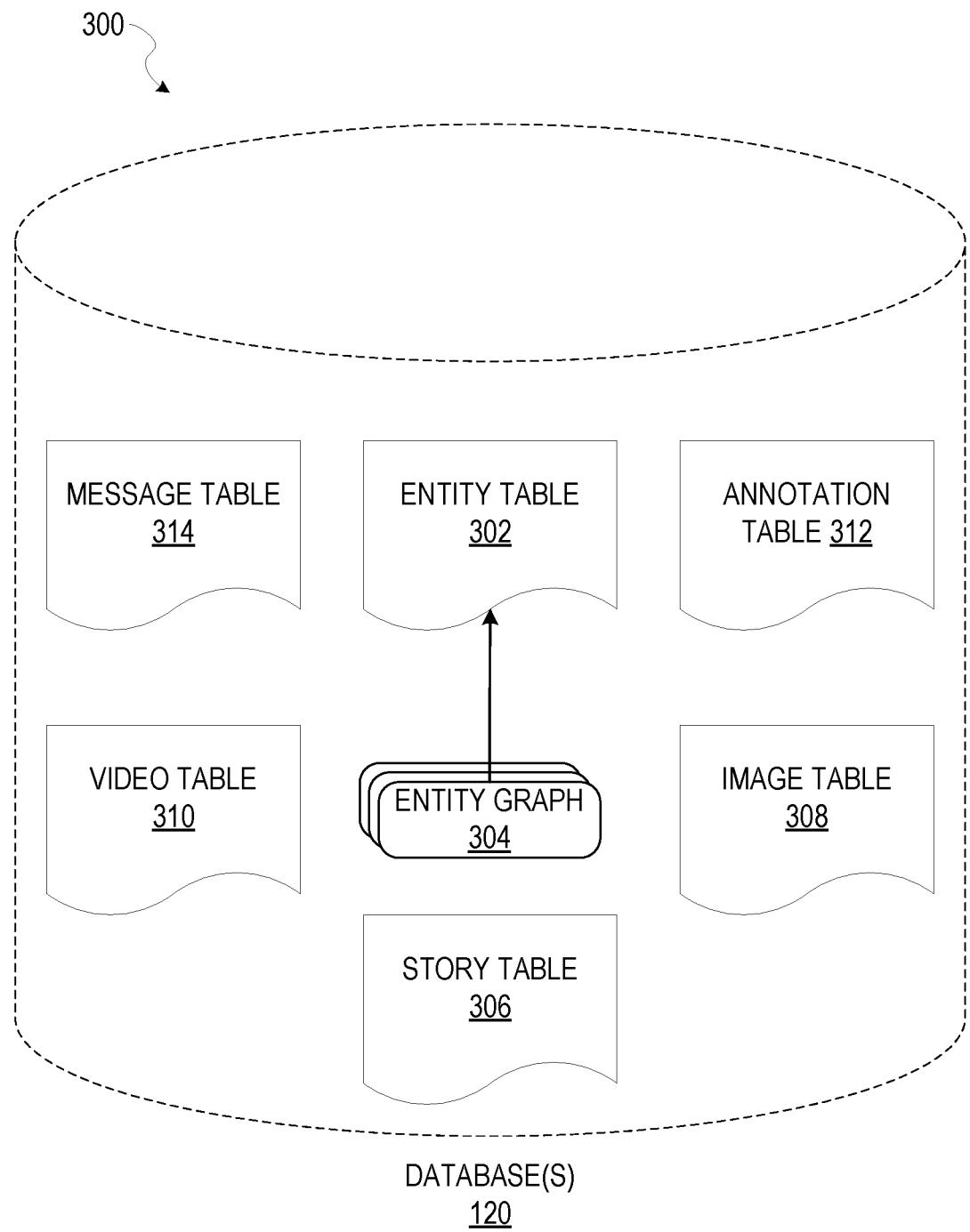
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT Story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
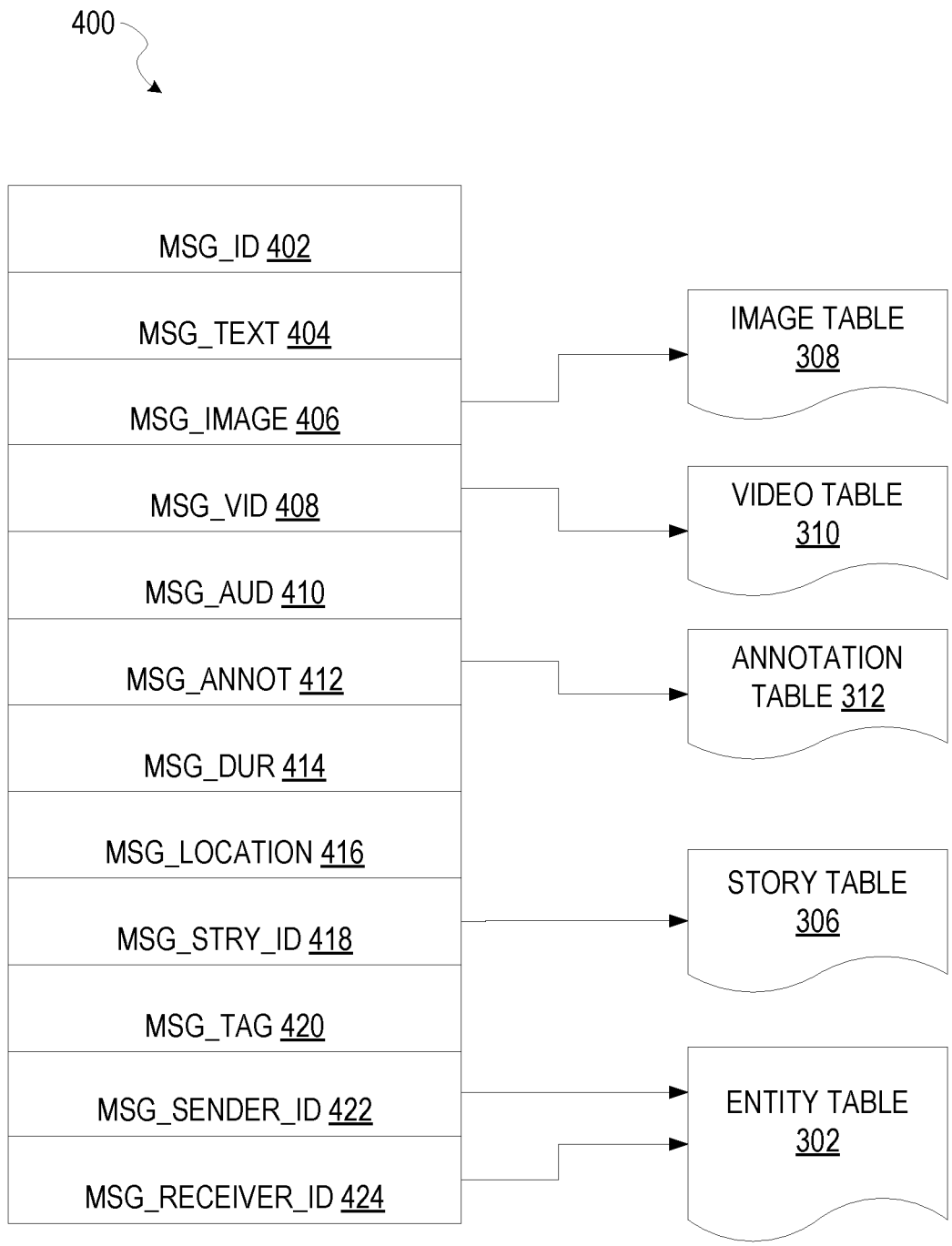
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data captured by a camera component of a client device 102 or retrieved from memory of a client device 102, and that is included in the message 400.

A message video payload 408: video data captured by a camera component or retrieved from a memory component of the client device 102, and that is included in the message 400.

A message audio payload 410: audio data captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: identifies values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
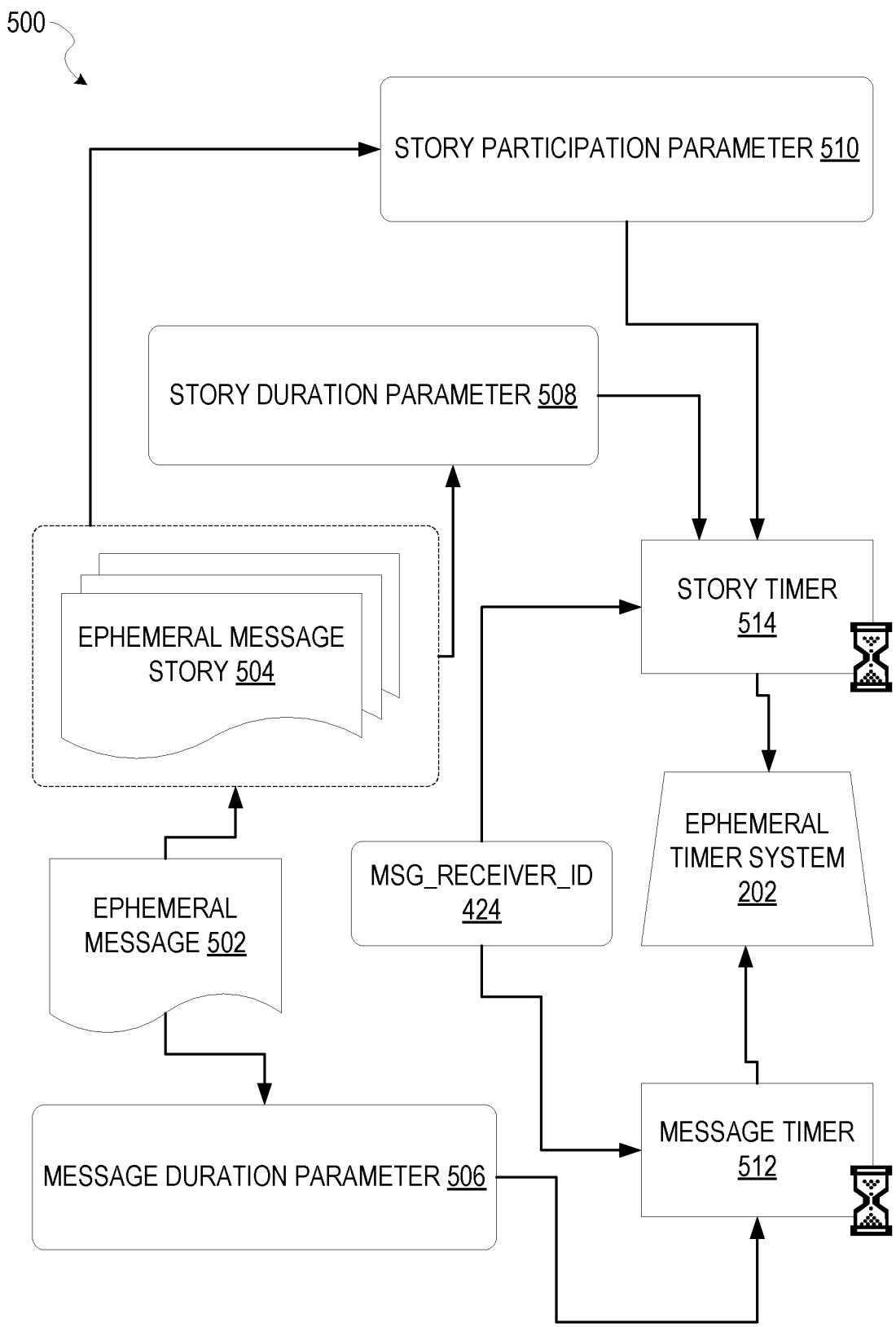
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT Story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
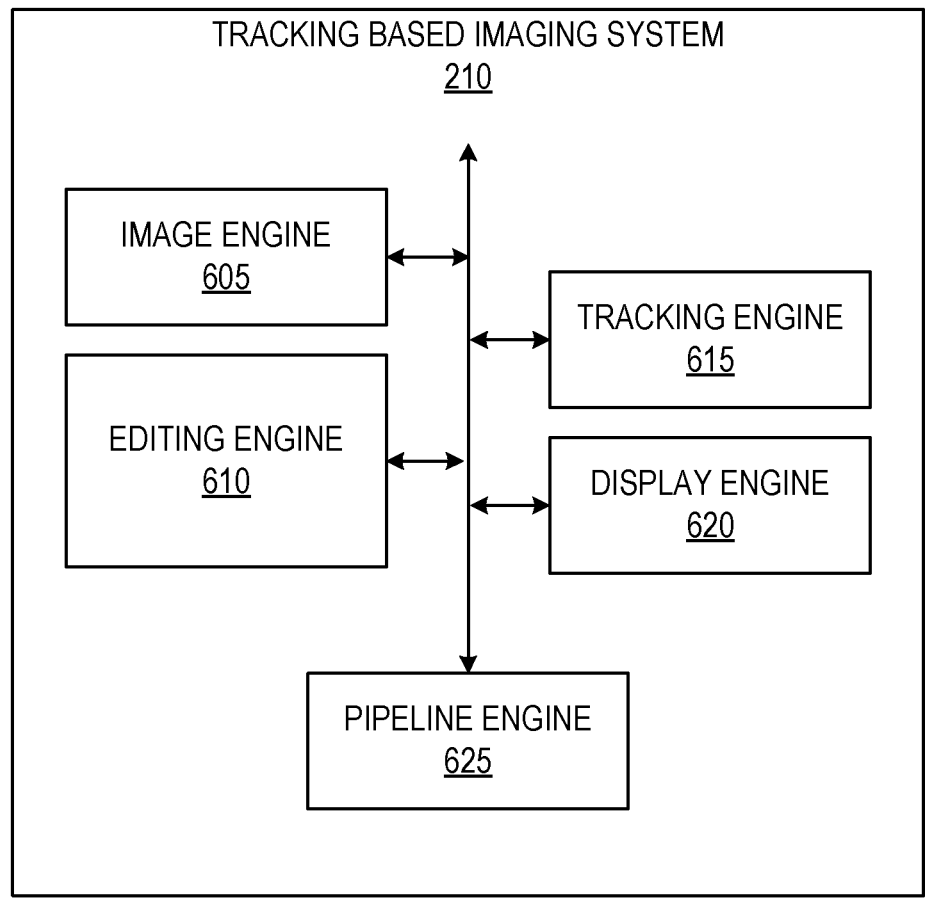
FIG. 6 shows an example internal functional components of a tracking based imaging system, according to some example embodiments.

FIG. 6 shows example internal functional components of a tracking-based imaging system 210, according to some example embodiments. As illustrated, the tracking-based imaging system 210 comprises an image engine 605, an editing engine 610, a tracking engine 615, a display engine 620, and a pipeline engine 625. The image engine 605 is configured generate one or more images (e.g., using an image sensor) using client device 102 and display the images on a display device of the client device 102. The image engine 605 is further configured, according to some example embodiments, to receive an instruction to apply an image effect on the one or more images. The image effect may require CNN-based image segmentation, CNN-based object tracking, or other computationally intensive image processing operations.

The editing engine 610 is configured to apply a machine learning scheme, such as a convolutional neural network, to the one or more images, according to some example embodiments. The tracking engine 615 is configured to track image features across a plurality of images, e.g., using flow maps. For example, the tracking engine 615 may use an optical flow scheme to create an optical flow map that describes how an image feature (e.g., pixels displaying an image feature) transforms or moves from one image to a subsequent image. The tracking engine 615 is further configured to apply flow maps to an image to generate a new image. The display engine 620 manages combining images generated by the editing engine 610 and the tracking engine 615 into a modified image sequence that can be displayed in real time on the client device 102 and published as an ephemeral message 502. The pipeline engine 625 manages the orchestration of the editing engine 610 operating from a first pipeline (e.g., a thread) and the tracking engine 615 operating from a second pipeline (e.g., an additional thread), as discussed in further detail below.

Figure 7:
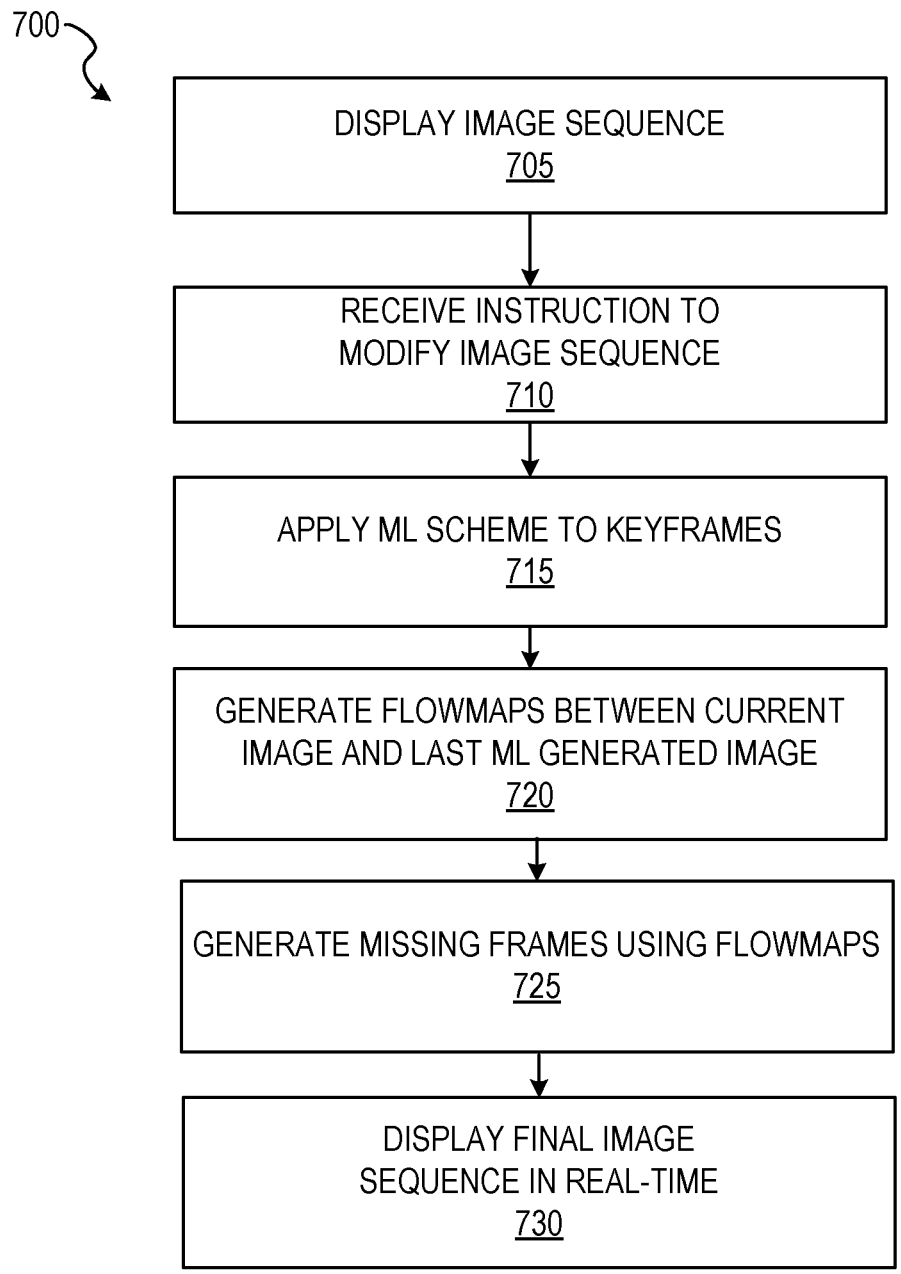
FIG. 7 shows a flow diagram of an example method for implementing tracking-compensated image effects, according to some example embodiments.

FIG. 7 shows a flow diagram of an example method 700 for implementing tracking compensated image effects, according to some example embodiments. At operation 705, the image engine 605 displays an image sequence on a display of a client device (e.g., client device 102). For example, the image engine 605 captures video using a client device camera. The image engine 605 then displays the video on a display device (e.g., screen) of the client device in real-time or near real-time (e.g., without noticeable delay between when an object is imaged and displayed on the screen of the client device). At operation 710, the image engine 605 receives an instruction to visually modify the image sequence. In particular, for example, a user of the client device may select a user interface (UI) button that generates an instruction to visually modify the image sequence. The instruction may require an effect generated by a convolutional neural network (CNN), such as image segmentation, object classification, object tracking, human form recognition, or other image schemes.

At operation 715, the machine learning engine applies a machine learning scheme to keyframes of the image sequence. In some example embodiments, the keyframes are every Nth image in the image sequence; for example, every other image (N=2), every third image, every fifth image, and so on. In some example embodiments, N is preconfigured to depend on the type of client device. For instance, if the editing engine 610 detects that it is executing from a latest model client device (e.g., iPhone 7, as of August 2017) then N=2; whereas if the editing engine 610 detects that it is executing from an older model client device (e.g., iPhone 4, as of August 2017), then N may be set higher than two, e.g., N=5. In some example embodiments, which image is a keyframe (and thus processed by the editing engine 610) varies depending on how fast the editing engine 610 can operates from its asynchronous pipeline, as discussed in further detail below.

At operation 720, the tracking engine 615 generates flow maps between the current image and the last image generated by the editing engine 610. The current image is the image of the image sequence that has not yet been processed by the editing engine 610 or the tracking engine 615. In some example embodiments, the flow maps are optical flow maps that include vector transformations that describe how pixels of image features move (e.g., transform, scale) from one image to a subsequent image.

At operation 725, the tracking engine 615 generates missing frames using the flow maps. The missing frames are frames between the keyframes that the editing engine 610 has skipped or otherwise not had a chance to process (e.g., because the editing engine 610 is busy processing an earlier image). In some example embodiments, the tracking engine 615 generates a given missing frame by applying the flow map to the last modified image generated by the editing engine 610.

At operation 730, the display engine 620 displays a final image sequence in real time on a display device. As discussed above, some of the images in the final image sequence are generated by the slower scheme (e.g., CNN) and some are generated by a faster scheme (e.g., optical flow) and combined on-the-fly for an overall increase in speed.

Figure 8:
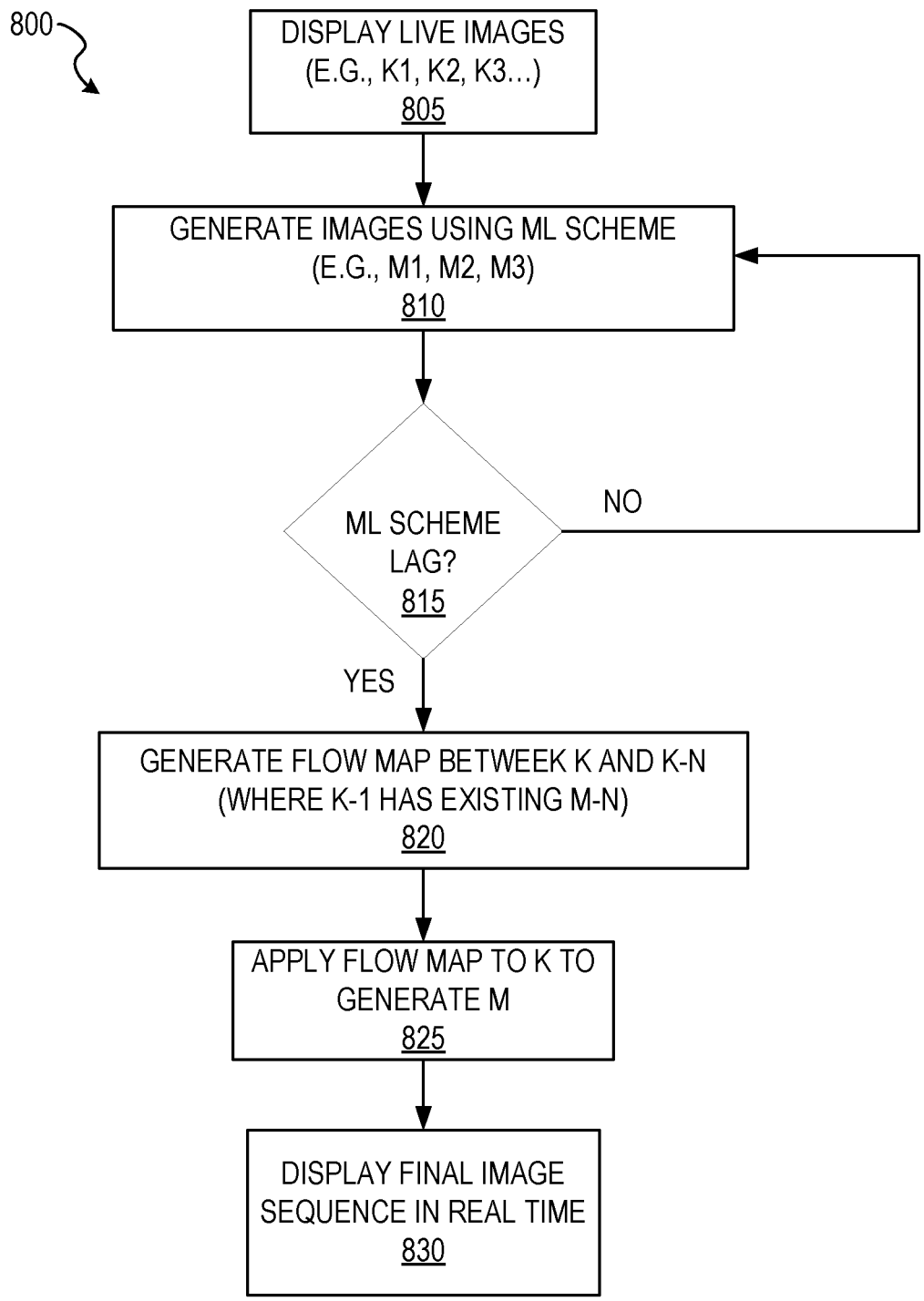
FIG. 8 shows a flow diagram of an example method for implementing asynchronous tracking compensation for image processing, according to some example embodiments.

FIG. 8 shows a flow diagram of an example method 800 for real-time tracking-compensated processing of images, according to some example embodiments. In those example embodiments, the editing engine 610 and the tracking engine 615 operate in different pipelines asynchronously (e.g., concurrently, in parallel). For example, the editing engine 610 may apply a CNN to generate image masks in a first thread, and the tracking engine 615 generates image masks in a second thread. The editing engine 610 is generally applying a more intensive computation scheme (e.g., CNN) than the tracking engine 615 is applying; thus, although they are working on the same image sequence, the editing engine 610 typically lags a number of frames behind the tracking engine 615. The amount of lag is allowed to vary according to how fast the editing engine 610 can complete its processes. The tracking engine 615 is configured to compensate for the varying lag of the editing engine 610 by generating a flow map and applying the flow map to the last image output by the editing engine 610, thereby generating a new modified image for the current frame. FIG. 8 shows an example of the dynamic asynchronous processes, according to some example embodiments. In FIG. 8, "K" refers to the original image sequence (e.g., image sequence 1105), thus IMG1 is K1, IMG2 is K2, and so on. Further, in FIG. 8, K without a number is the current frame, in that it is the next image to be processed. Further, N tracks order, thus K–N is some image before the current frame (e.g., K–1, is the image immediately before the current image, K).

At operation 805, the image engine 605 generates a sequence of images, e.g., K1, K2, K3, etc. At operation 810, the editing engine 610 starts processing each of the images to generate modified images, M1, M2, M3, etc. For example, the editing engine 610 applies a trained CNN to K1 to generate M1, and so on. At operation 815, the pipeline engine 625 determines whether the editing engine 610 is lagging. For example, the pipeline engine 625 determines whether the editing engine 610 is still processing images preceding the current frame, where the current frame is the next image to be processed. If the editing engine 610 is not lagging, the method 800 returns to operation 810 whereby the editing engine 610 applies a CNN to the next image.

If the editing engine 610 is lagging, the pipeline engine 625 instantiates a second pipeline (e.g., thread) to generate a flow map in operation 820. In particular, the tracking engine 615, operating from the second pipeline, generates a flow map between the current frame and the last frame for which the editing engine 610 has generated an output. For example, if the editing engine 610 last generated an image mask five frames behind the current frame, a flow map is generated between the original image five frames back and the current image. The flow map thus captures changes from where the editing engine 610 is currently lagging to the current frame to be processed. At operation 825, the tracking engine 615 applies the flow map to the actual last output of the editing engine 610 to generate an output (e.g., mask) for the current frame. The operations of 810, 815, 820, and 825 are allowed to vary according to how fast the engines in each of the pipelines can operate. At operation 830, a final image sequence is displayed in real time or near real time on a display device.

As discussed, in some example embodiments, the final image sequence can be a further image sequence generated using the outputs of the editing engine 610 and tracking engine 615. For example, image masks generated by the two pipelines asynchronously can be applied to replace a color of a hat from red to blue in a final image sequence. In some example embodiments, the outputs of the editing engine 610 and the tracking engine 615 are images (e.g., not image masks) that are displayed at operation 830. For example, the editing engine 610 may be applying a CNN-based artistic stylization to the images (e.g., style transfer), and the tracking engine 615 mimics the artistic style, and the outputs of the engines are collated and displayed in real-time.

Figure 12:
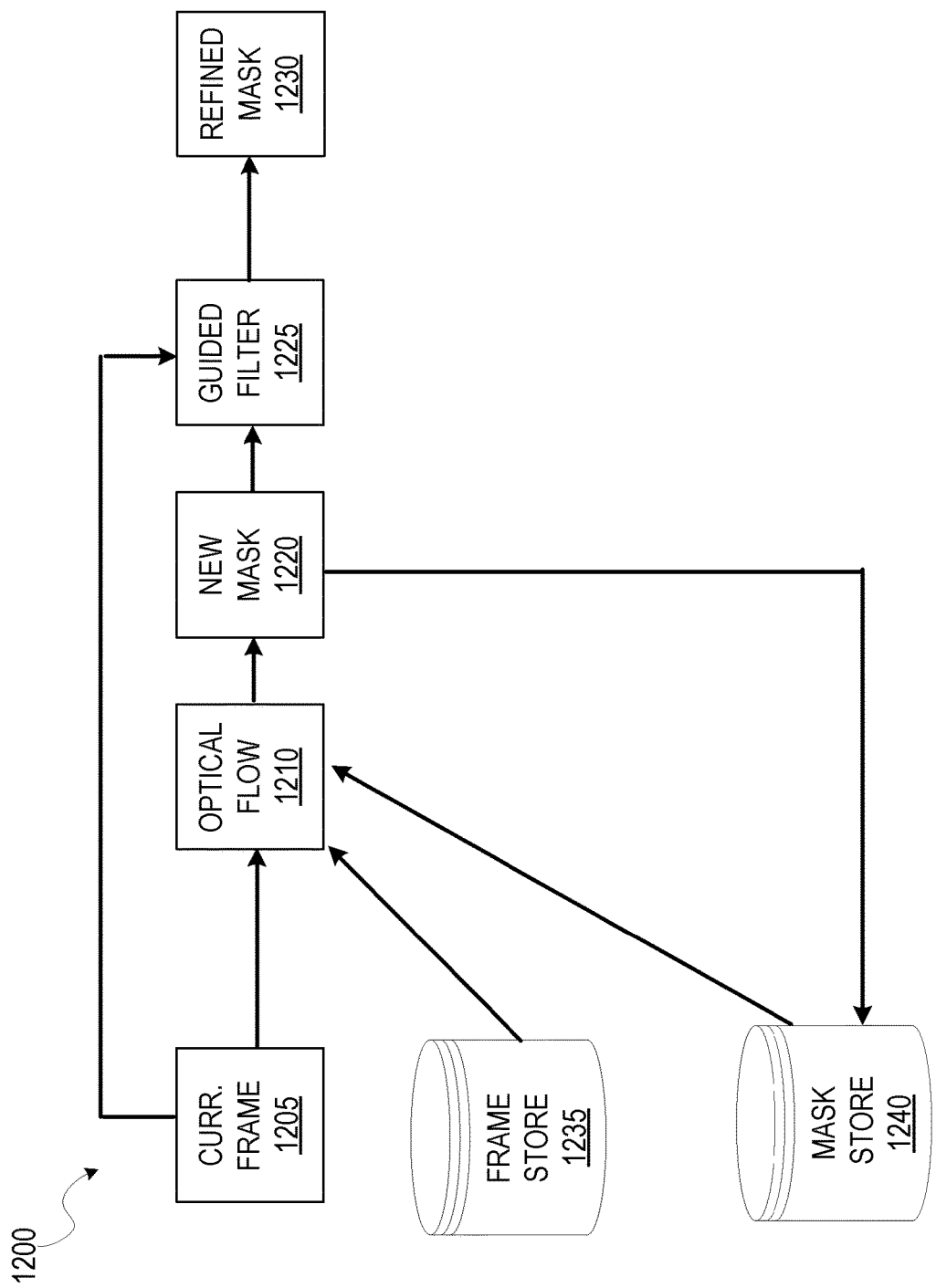
FIG. 12 shows a data flow for refining image masks, according to some example embodiments.

Jumping to FIG. 12, FIG. 12 shows a data flow 1200 for refining image masks, according to some example embodiments. The frame store 1235 stores images of the original image sequence (e.g., image sequence 1105, FIG. 11) and the mask store 1240 stores image masks (e.g., modified image sequence 1110, FIG. 11). The frame store 1235 and the mask store 1240 may be rolling buffers that track the last N frames, e.g., the last 100 frames that precede the current frame, where the current frame is the next frame to be processed.

The current frame 1205 is input into the tracking engine 615, which uses the current frame 1205 and a preceding frame from frame store 1235 to generate new mask 1220 as discussed above (e.g., the preceding frame is a frame for which a mask exists). The new mask 1220 is stored in mask store 1240 so it can be used to generate a final image (e.g., a girl with a blue hat instead of red hat).

The new mask 1220 may be rough as it is an approximation generated using optical flow 1210. To improve the accuracy of the new mask 1220, the tracking engine 615 implements a guided filter 1225 that uses the current frame 1205 as a guide to refine and correct errors in the new mask 1220. The refined mask 1230 is then output from the guided filter 1225 for further processing (e.g., for recoloring a hat from red to blue).

Figure 13:
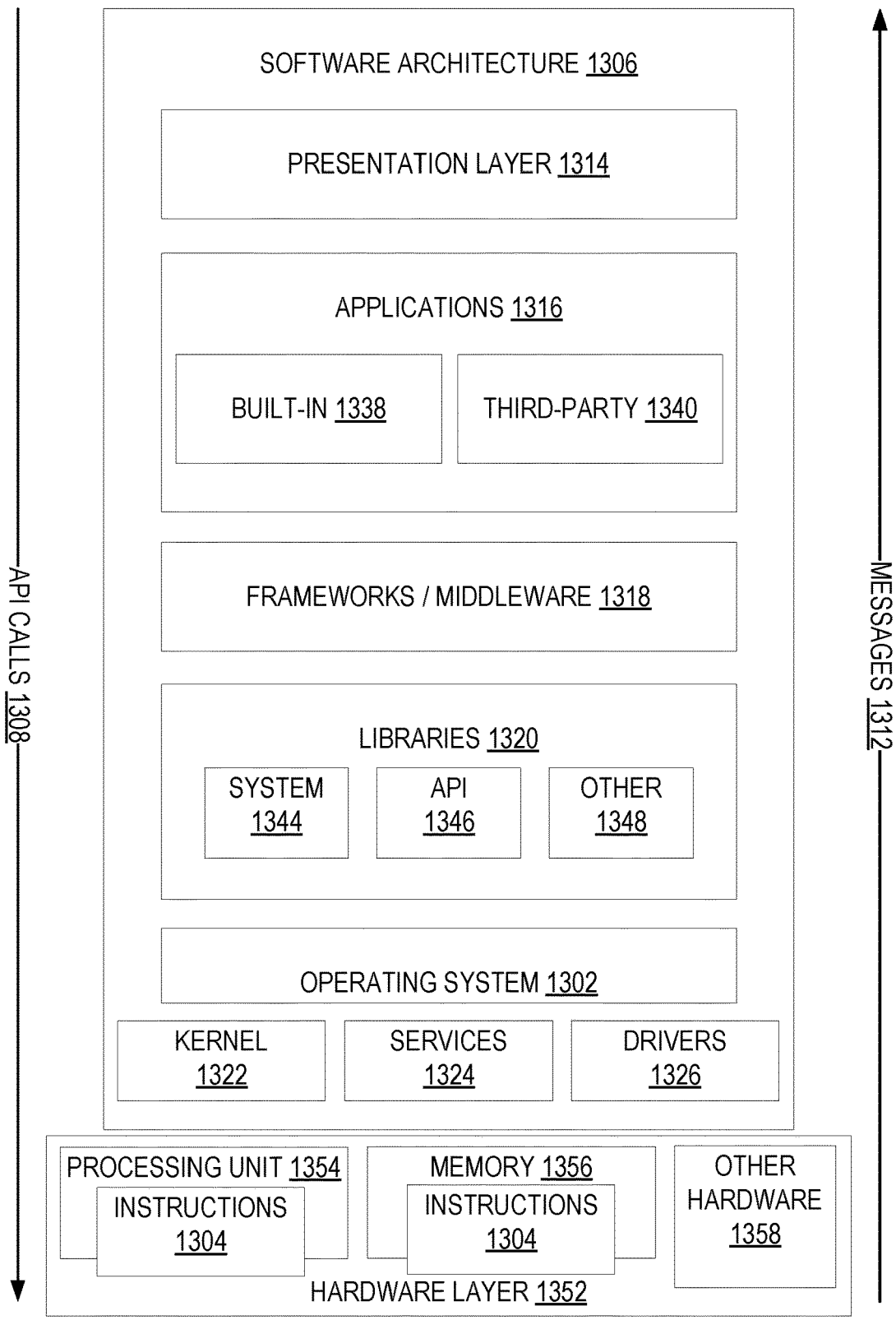
FIG. 13 is a block diagram illustrating a representative software architecture, which may be used in conjunction with various hardware architectures herein described.

FIG. 13 is a block diagram illustrating an example software architecture 1306, which may be used in conjunction with various hardware architectures herein described. FIG. 13 is a non-limiting example of a software architecture, and it will be appreciated that many other architectures may be implemented to facilitate the functionality described herein. The software architecture 1306 may execute on hardware such as a machine 1400 of FIG. 14 that includes, among other things, processors, memory, and I/O components. A representative hardware layer 1352 is illustrated and can represent, for example, the machine 1400 of FIG. 14. The representative hardware layer 1352 includes a processing unit 1354 having associated executable instructions 1304. The executable instructions 1304 represent the executable instructions of the software architecture 1306, including implementation of the methods, components, and so forth described herein. The hardware layer 1352 also includes a memory/storage 1356, which also has the executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, frameworks/middleware 1318, applications 1316, and a presentation layer 1314. Operationally, the applications 1316 and/or other components within the layers may invoke API calls 1308 through the software stack and receive a response in the form of messages 1312. The layers illustrated are representative in nature and not all software architectures have all layers. For example, some mobile or special-purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324, and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1320 provide a common infrastructure that is used by the applications 1316 and/or other components and/or layers. The libraries 1320 provide functionality that allows other software components to perform tasks in an easier fashion than by interfacing directly with the underlying operating system 1302 functionality (e.g., kernel 1322, services 1324, and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 provide a higher-level common infrastructure that may be used by the applications 1316 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. The third-party applications 1340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1340 may invoke the API calls 1308 provided by the mobile operating system (such as the operating system 1302) to facilitate functionality described herein.

The applications 1316 may use built-in operating system functions (e.g., kernel 1322, services 1324, and/or drivers 1326), libraries 1320, and frameworks/middleware 1318 to create user interfaces to interact with users of the system. Alternatively, or additionally, in some systems, interactions with a user may occur through a presentation layer, such as the presentation layer 1314. In these systems, the application/component "logic" can be separated from the aspects of the application/component that interact with a user.

Figure 14:
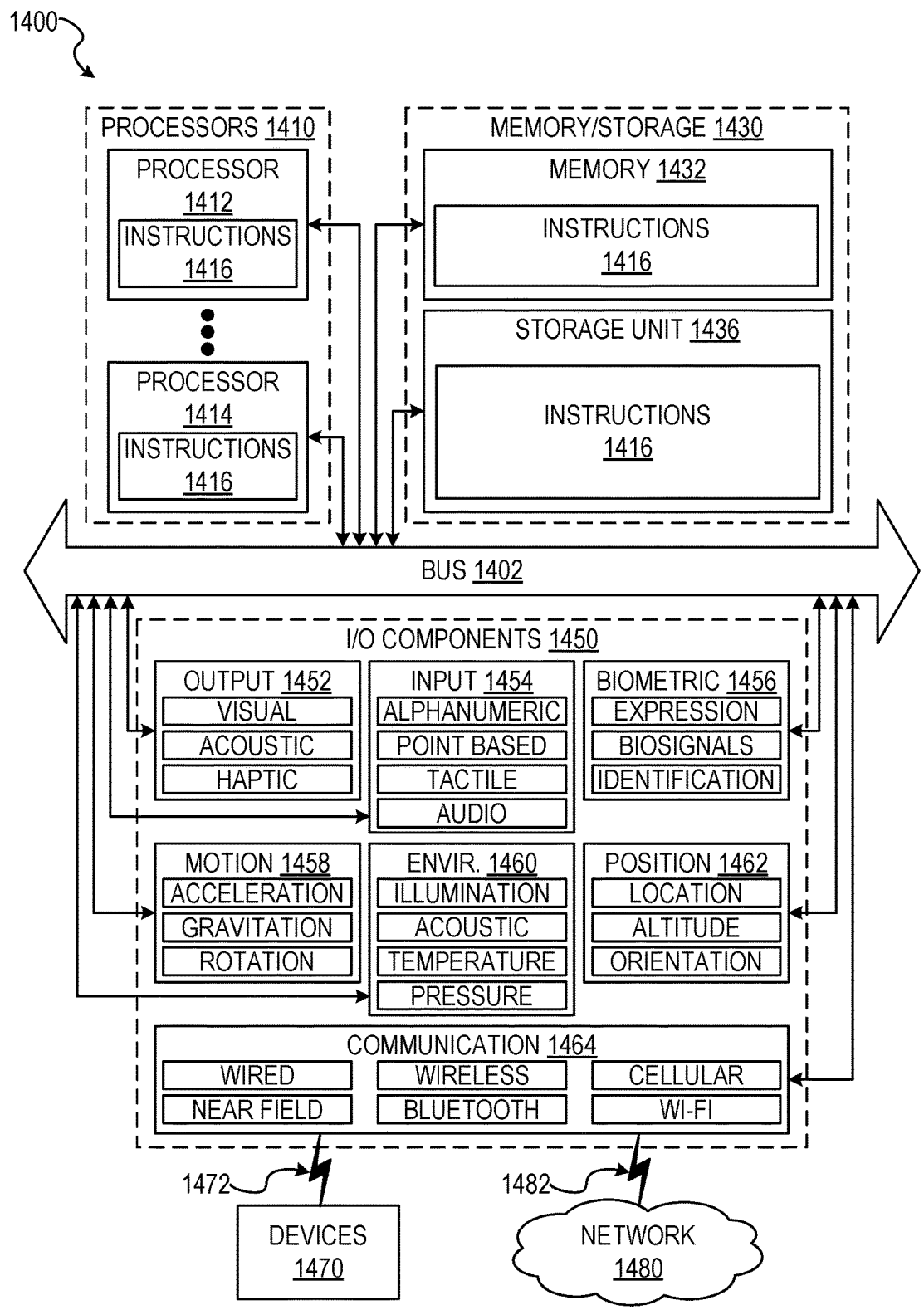
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. As such, the instructions 1416 may be used to implement modules or components described herein. The instructions 1416 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines that individually or jointly execute the instructions 1416 to perform any one or more of the methodologies discussed herein.

The machine 1400 may include processors 1410, memory/storage 1430, and I/O components 1450, which may be configured to communicate with each other such as via a bus 1402. The memory/storage 1430 may include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor cache memory accessible to processor units 1412 or 1414), or any suitable combination thereof, during execution thereof by the machine 1400. Accordingly, the memory 1432, the storage unit 1436, and the memory of the processors 1410 are examples of machine-readable media.

The I/O components 1450 may include a wide variety of components to receive input, provide output, produce output, transmit information, exchange information, capture measurements, and so on. The specific I/O components 1450 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environment components 1460, or position components 1462 among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1458 may include acceleration sensor components (e.g., accelerometer), gravitation sensor components, rotation sensor components (e.g., gyroscope), and so forth. The environment components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1462 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or other suitable device to interface with the network 1480. In further examples, the communication components 1464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a USB).

Moreover, the communication components 1464 may detect identifiers or include components operable to detect identifiers. For example, the communication components 1464 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

GLOSSARY

"CARRIER SIGNAL" in this context refers to any intangible medium that is capable of storing, encoding, or carrying instructions 1416 for execution by the machine 1400, and includes digital or analog communications signals or other intangible media to facilitate communication of such instructions 1416. Instructions 1416 may be transmitted or received over the network 1480 using a transmission medium via a network interface device and using any one of a number of well-known transfer protocols.

"CLIENT DEVICE" in this context refers to any machine 1400 that interfaces to a communications network 1480 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1480.

"COMMUNICATIONS NETWORK" in this context refers to one or more portions of a network 1480 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1480 may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EMPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message 400 is transitory.

"MACHINE-READABLE MEDIUM" in this context refers to a component, a device, or other tangible media able to store instructions 1416 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1416. The term "machine-readable medium" shall also be taken to include any medium, or combination of multiple media, that is capable of storing instructions 1416 (e.g., code) for execution by a machine 1400, such that the instructions 1416, when executed by one or more processors 1410 of the machine 1400, cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1412 or a group of processors 1410) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1400) uniquely tailored to perform the configured functions and are no longer general-purpose processors 1410. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1412 configured by software to become a special-purpose processor, the general-purpose processor 1412 may be configured as respectively different special-purpose processors (e.g., comprising different hardware components) at different times. Software accordingly configures a particular processor 1412 or processors 1410, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1410 that are temporarily configured (e.g., by software) or permanently configured to perform the relevant operations. Whether temporarily or permanently configured, such processors 1410 may constitute processor-implemented components that operate to perform one or more operations or functions described herein. As used herein, "processor-implemented component" refers to a hardware component implemented using one or more processors 1410. Similarly, the methods described herein may be at least partially processor-implemented, with a particular processor 1412 or processors 1410 being an example of hardware. For example, at least some of the operations of a method may be performed by one or more processors 1410 or processor-implemented components. Moreover, the one or more processors 1410 may also operate to support performance of the relevant operations in a "cloud computing" environment or as a "software as a service" (SaaS). For example, at least some of the operations may be performed by a group of computers (as examples of machines 1400 including processors 1410), with these operations being accessible via a network 1480 (e.g., the Internet) and via one or more appropriate interfaces (e.g., an API). The performance of certain of the operations may be distributed among the processors 1410, not only residing within a single machine 1400, but deployed across a number of machines 1400. In some example embodiments, the processors 1410 or processor-implemented components may be located in a single geographic location (e.g., within a home environment, an office environment, or a server farm). In other example embodiments, the processors 1410 or processor-implemented components may be distributed across a number of geographic locations.

"PROCESSOR" in this context refers to any circuit or virtual circuit (a physical circuit emulated by logic executing on an actual processor 1412) that manipulates data values according to control signals (e.g., "commands," "op codes," "machine code," etc.) and which produces corresponding output signals that are applied to operate a machine 1400. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1410 may further be a multi-core processor 1410 having two or more independent processors 1412, 1414 (sometimes referred to as "cores") that may execute instructions 1416 contemporaneously.

"TIMESTAMP" in this context refers to a sequence of characters or encoded information identifying when a certain event occurred, for example giving date and time of day, sometimes accurate to a small fraction of a second.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SNAP INC., All Rights Reserved.

What is claimed is:

1. A method comprising:
    generating, using an image sensor, an image sequence;
    generating modified keyframe images by processing alternating images from the image sequence using a machine learning scheme, the alternating images from the image sequence being keyframe images that are separated by one or more non-keyframe images;
    generating modified non-keyframe images using flow maps generated between the non-keyframe images and preceding keyframe images, the modified non-keyframe images being generated by applying the flow maps to the modified keyframe images;
    displaying, on a display device, a modified image sequence generated using the modified keyframe images and the modified non-keyframe images.

2. The method of claim 1, wherein the modified keyframe images are generated in a first pipeline and the modified non-keyframe images are generated in a second pipeline, wherein the second pipeline is asynchronous from the first pipeline.

3. The method of claim 2, wherein the machine learning scheme is a convolutional neural network.

4. The method of claim 1, further comprising:
    publishing the modified image sequence as an ephemeral message on a social media network.

5. The method of claim 1, wherein each flow map is generated by a non-keyframe image and a preceding keyframe image, the non-keyframe image and the preceding keyframe image separated by one or more additional non-keyframe images.

6. The method of claim 1, wherein the preceding keyframe images used to generate the flow maps have existing modified keyframe images, and the flow maps are applied to the existing modified keyframe images.

7. The method of claim 1, wherein the modified image sequence is displayed on the display device in one or more of: real time or near real time.

8. The method of claim 1, wherein the modified keyframe images and the modified non-keyframe images are ordered in the modified image sequence according to an ordering of images in the image sequence.

9. The method of claim 1, further comprising:
    generating the modified image sequence by using the modified keyframe images and the modified non-keyframe images.

10. The method of claim 9, wherein the modified keyframe images and the modified non-keyframe images are image masks used to apply one or more visual effects to the image sequence.

11. The method of claim 1, further comprising:
generating the flow maps using a motion tracking scheme that describes transformations of image features across a plurality of images.

12. A system comprising:
one or more processors of a machine;
a display device; and
a memory storing instructions that, when executed by the one or more processors, cause the machine to perform operations comprising:
generating an image sequence;
generating modified keyframe images by processing alternating images from the image sequence using a machine learning scheme, the alternating images from the image sequence being keyframe images that are separated by one or more non-keyframe images;
generating modified non-keyframe images using flow maps generated between the non-keyframe images and preceding keyframe images, the modified non-keyframe images being generated by applying the flow maps to the modified keyframe images; and
displaying, on the display device, a modified image sequence generated using the modified keyframe images and the modified non-keyframe images.

13. The system of claim 12, wherein the modified keyframe images are generated in a first pipeline and the modified non-keyframe images are generated in a second pipeline, wherein the second pipeline is asynchronous from the first pipeline.

14. The system of claim 13, wherein the machine learning scheme is a convolutional neural network.

15. The system of claim 13, wherein the first pipeline and the second pipeline operate in parallel.

16. The system of claim 12, wherein each flow map is generated by a non-keyframe image and a preceding keyframe image, the non-keyframe image and the preceding keyframe image separated by one or more additional non-keyframe images.

17. The system of claim 12, wherein the preceding keyframe images used to generate the flow maps have existing modified keyframe images, and the flow maps are applied to the existing modified keyframe images.

18. The system of claim 12, wherein the modified image sequence is displayed on the machine in one or more of: real time or near real time.

19. A non-transitory machine readable medium embodying instructions that, when executed by a machine, cause the machine to perform operations comprising:
generating an image sequence;
generating modified keyframe images by processing alternating images from the image sequence using a machine learning scheme, the alternating images from the image sequence being keyframe images that are separated by one or more non-keyframe images;
generating modified non-keyframe images using flow maps generated between the non-keyframe images and preceding keyframe images, the modified non-keyframe images being generated by applying the flow maps to the modified keyframe images; and
displaying, on a display device, a modified image sequence generated using the modified keyframe images and the modified non-keyframe images.

20. The non-transitory machine readable medium of claim 19, wherein the modified keyframe images are generated in a first pipeline and the modified non-keyframe images are generated in a second pipeline, wherein the second pipeline is asynchronous to the first pipeline.

* * * * *

UNITED STATES PATENT AND TRADEMARK OFFICE
CERTIFICATE OF CORRECTION

PATENT NO. : 10,474,900 B2
APPLICATION NO. : 15/706096
DATED : November 12, 2019
INVENTOR(S) : Hare et al.

It is certified that error appears in the above-identified patent and that said Letters Patent is hereby corrected as shown below:

On the Title Page

Item [72], delete "Ray," and insert --Rey,-- therefor

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*